R. KNEBEL.
DRILL CHUCK.
APPLICATION FILED MAR. 6, 1919.
1,318,090.
Patented Oct. 7, 1919.
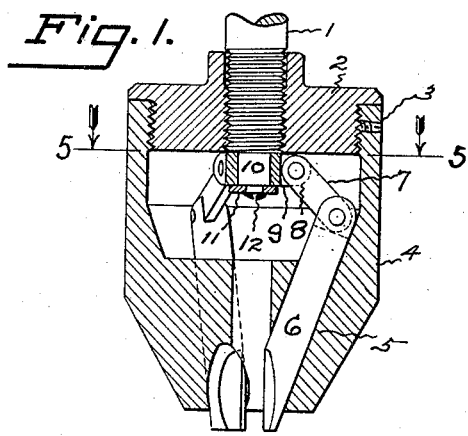
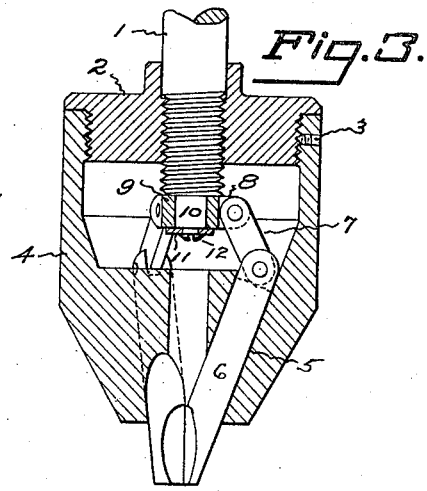
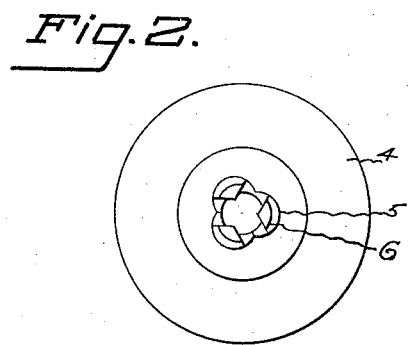
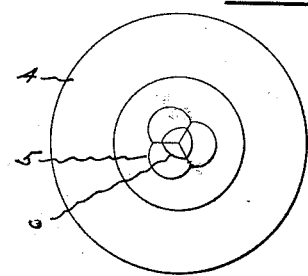
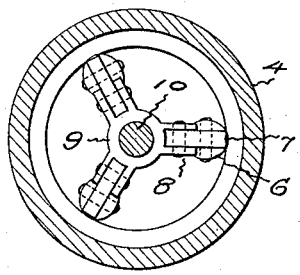
Inventor
Richard Knebel, by
Harry P. Williams
Attorney

UNITED STATES PATENT OFFICE.

RICHARD KNEBEL, OF NEW BRITAIN, CONNECTICUT.

DRILL-CHUCK.

1,318,090.　　　　　Specification of Letters Patent.　　　Patented Oct. 7, 1919.

Application filed March 6, 1919. Serial No. 280,997.

*To all whom it may concern:*

Be it known that I, RICHARD KNEBEL, a citizen of the United States, residing at New Britain, in the county of Hartford and State of Connecticut, have invented a new and useful Improvement in Drill-Chucks, of which the following is a specification.

This invention relates to that type of drill chuck in which the jaws are moved obliquely for opening and closing by the rotation of the body of the chuck on the shank.

The object of the invention is to provide a chuck of this character which is composed of a very few simple parts that are cheap to manufacture and assemble, and which is easily operated for tightly closing the jaws on a drill shank or opening the jaws therefrom.

In the accompanying drawings Figure 1 shows a central longitudinal section of the chuck with the jaws opened. Fig. 2 is a view looking at the jaw end of the chuck with the jaws opened. Fig. 3 shows a central longitudinal section with the jaws closed. Fig. 4 is a view looking at the jaw end of the chuck with the jaws closed. Fig. 5 shows a transverse section taken on the plane indicated by the dotted line 5—5 on Fig. 1.

The shank 1 of the chuck is threaded, and turning on the threaded section of the shank is a cap 2 which has a thread on its edge as well as the central interior thread. Screwed upon this cap and fixed thereto by means of a set screw 3 or otherwise is the open end of the hollow body 4. The body is provided with three bores 5 that are circular in cross section and extend inward obliquely from the tapered end of the body. In these bores are loosely fitted the jaws 6 which are formed from sections of round rod. The outer or gripping ends of the jaws are beveled, as is customary, so that they will meet when closed together. The inner ends of these jaws are joined by pivotally connected links 7 with the lugs 8 that project from a spider 9 which is free to turn loosely upon the reduced end 10 of the shank. The spider is held on the shank by means of a washer 11 that may be secured to the end of the shank in any desired way, as by a screw 12.

When the body of the chuck is rotated, it carries the jaws, links, spider and cap, and the rotation of the cap causes it to traverse along the threaded shank according to the direction in which the parts are turned. If the body is turned so that the cap travels down on the shank the jaws are opened from each other, Fig. 1, and if the body is turned so that the cap travels up on the shank the jaws are closed toward each other, Fig. 3, the jaws being retained from longitudinal movement by the links, spider and shank as the cap and body travel longitudinally of the shank.

The invention claimed is:

1. A chuck comprising a cylindrical body having one end open and having a solid tapering nose at the other end with obliquely extending jaw bores in said nose, a cap fixed in the open end of the body, said cap having a threaded central perforation, a threaded shank fitted to and turning in the threaded opening of said cap, jaws fitting said oblique bores in the body, and links connecting the inner ends of the jaws with the end of said shank, whereby turning the body causes it to travel longitudinally of the axis of the shank and move the jaws transversely of the axis of the shank.

2. A chuck having a threaded shank, a cap threaded on the shank, a body secured to and adapted to rotate the cap, jaws arranged obliquely in openings in the body, a spider rotarily mounted on the end of the shank, means holding the spider against longitudinal movement on the shank, and links connecting the inner ends of the jaws with the spider.

3. A chuck having a threaded shank, a cap threaded on the shank, a cylindrical body threaded on the cap, jaws arranged obliquely in openings in the end of the body opposite the cap, a spider swiveled on the end of the shank, and links connecting the inner ends of the jaws with the spider.

RICHARD KNEBEL.

Copies of this patent may be obtained for five cents each, by addressing the "Commissioner of Patents, Washington, D. C."